US008951639B2

(12) United States Patent
White et al.

(10) Patent No.: US 8,951,639 B2
(45) Date of Patent: Feb. 10, 2015

(54) THERMALLY ROBUST CAPSULE SYSTEM, AND COMPOSITES INCLUDING THE CAPSULES

(75) Inventors: Scott R. White, Champaign, IL (US);
Jeffrey S. Moore, Savoy, IL (US);
Nancy R. Sottos, Champaign, IL (US);
Benjamin J. Blaiszik, Urbana, IL (US);
Mary M. Caruso, Oakdale, MN (US);
Christian L. Mangun, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 233 days.

(21) Appl. No.: 13/421,986

(22) Filed: Mar. 16, 2012

(65) Prior Publication Data
US 2013/0072596 A1 Mar. 21, 2013

Related U.S. Application Data

(60) Provisional application No. 61/453,324, filed on Mar. 16, 2011.

(51) Int. Cl.
| C08L 75/04 | (2006.01) |
| C08L 79/08 | (2006.01) |
| B01J 13/20 | (2006.01) |
| B01J 13/22 | (2006.01) |

(52) U.S. Cl.
CPC ............. *C08L 75/04* (2013.01); *B01J 13/20* (2013.01); *B01J 13/22* (2013.01)
USPC ............ 428/402.24; 428/402; 428/402.2; 264/4.1; 264/7; 523/456; 523/115; 523/116

(58) Field of Classification Search
USPC ............ 523/456; 525/456, 455; 524/542; 428/402–402.24, 403, 404, 407, 321.1, 428/474.4; 427/331, 389.9, 212, 427/213–213.36, 483, 256; 264/534, 5, 41, 264/4–4.7
See application file for complete search history.

(56) References Cited

U.S. PATENT DOCUMENTS

2007/0166542 A1* 7/2007 Braun et al. ............. 428/402.21
2008/0291526 A1* 11/2008 Lin et al. ....................... 359/296

OTHER PUBLICATIONS

Beiermann, B. A., et al., "Self-healing flexible laminates for resealing of puncture damage", 2009, pp. 1-7, vol. 18, Publisher: Smart Materials and Structures.
Blaiszik, B. J., et al., "Nanocapsules for self-healing materials", 2008, pp. 978-986, vol. 68.

(Continued)

*Primary Examiner* — James J Seidleck
*Assistant Examiner* — S. Camilla Pourbohloul
(74) *Attorney, Agent, or Firm* — Blanchard & Associates

(57) ABSTRACT

A method of making capsules includes forming a mixture including a core liquid, a polyurethane precursor system, a first component of a two-component poly(urea-formaldehyde) precursor system, and a solvent. The method further includes emulsifying the mixture, adding a second component of the two-component poly(urea-formaldehyde) precursor system to the emulsified mixture, and maintaining the emulsified mixture at a temperature and for a time sufficient to form a plurality of capsules that encapsulate at least a portion of the core liquid. The capsules made by the method may include a polymerizer in the capsules, where the capsules have an inner capsule wall including a polyurethane, and an outer capsule wall including a poly(urea-formaldehyde). The capsules may include in the solid polymer matrix of a composite material.

10 Claims, 6 Drawing Sheets

(56) References Cited

OTHER PUBLICATIONS

Blaiszik, James Benjamin, "Development of Micro and Nanostructured Materials for Interfacial Self-Healing", 2009, Publisher: University of Illinois at Urbana-Champaign; Dissertation.

Blaiszik, B. J., et al., "Microcapsules filled with reactive solutions for self-healing materials", 2009, pp. 990-997, vol. 50, Publisher: Polymer.

Brown, E. N., et al., "Fracture Testing of a Self-Healing Polymer Composite", 2002, pp. 372-379, vol. 42.

Brown, et al., "In situ poly(urea-formaldehyde) microencapsulation of dicyclopentadiene", "J. Microencapsulation", 2003, pp. 719-730, vol. 20, No. 6.

Brown, E. N., et al., "Microcapsule induced toughening in a self-healing polymer composite", 2004, pp. 1703-1710, vol. 39, Publisher: Journal of Materials Science.

Caruso, et al., "Self-Promoted Self-Healing Epoxy Materials", "Macromolecules", 2007, pp. 8830-8832, vol. 40.

Caruso, M. M., et al., "Full Recovery of Fracture Toughness Using a Nontoxic Solvent-Based Self-Healing System", 2008, pp. 1898-1904, Publisher: Advanced Functional.

Caruso, M. M., et al., "Mechanically-Induced Chemical Changes in Polymeric Materials", 2009, pp. 5755-5798, vol. 109, Publisher: American Chemical Society.

Cho, et al., "Polydimethylsiloxane-Based Self-Healing Materials", "Adv. Mater.", 2006, pp. 997-1000, vol. 18.

Cho, S. H., et al., "Self-Healing Polymer Coatings", 2009, pp. 645-649, vol. 21.

Kamphaus, J. M., et al., "A new self-healing epoxy with tungsten (VI) chloride catalyst", 2008, pp. 95-103, vol. 5, Publisher: Journal of the Royal Society Interface.

Keller, M. W., et al., "Mechanical Properties of Microcapsules Used in a Self-Healing Polymer", 2006, pp. 725-733, vol. 46, Publisher: Experimental Mechanics.

Keller, M. W., et al., "A Self-Healing Poly(Dimethyl Siloxane) Elastomer**", 2007, pp. 2399-2404, vol. 17, Publisher: Advanced Functional Materials.

Kessler, M. R., et al., "Self-healing structural composite materials", 2003, pp. 743-753, vol. 34, Publisher: Composites: Part A.

Li, G., et al., "Preparation of Mono-Dispersed Polyurea-Urea Formaldehyde Double Layered Microcapsules", 2008, pp. 725-731, vol. 60, Publisher: Polymer Bulletin.

Liu, K. K.;, "Compressive deformation of a single microcapsule", 1996, pp. 6673-6680, vol. 54, No. 6, Publisher: The American Physical Society.

Sun, G., et al., "Mechanical strength of microcapsules made of different wall materials", 2002, pp. 307-311, vol. 242, Publisher: International Journal of Pharmaceutics.

White, S. R. et al., "Autonomic healing of Polymer Composites", Feb. 2001, pp. 794-797, vol. 409, Publisher: Nature.

White, S. R., et al., "Autonomic Healing of Polymers", "MRS Bulletin", 2008, vol. 33.

Wilson, G. O., et al., "Autonomic Healing of Epoxy Vinyl Esters via Ring Opening Metathesis Polymerization", 2008, pp. 44-52, vol. 18, Publisher: Advanced Functional Materials.

Yang, J., et al., "Microencapsulation of Isocyanates for Self-Healing Polymers", 2008, pp. 9650-9655, vol. 41, Publisher: American Chemical Society.

Zhang et al., "Mechanical Strength of Single Microcapsules Determined by a Novel Micromanipulation Technique", 1999, pp. 117-124, vol. 16, No. 1, Publisher: Journal of Microencapsulation.

* cited by examiner

THERMALLY ROBUST CAPSULE SYSTEM, AND COMPOSITES INCLUDING THE CAPSULES

REFERENCE TO RELATED APPLICATIONS

This application claims the benefit of U.S. Provisional Application No. 61/453,324 entitled "Thermally Robust Microcapsules For Self-Healing Polymeric" filed Mar. 16, 2011, which is incorporated by reference in its entirety.

FEDERALLY SPONSORED RESEARCH OR DEVELOPMENT

This invention was made with government support under contract number(s) FA9550-05-1-0346, FA9550-06-1-0553, awarded by the Air Force Office of Research. The government has certain rights in the invention.

BACKGROUND

Cracks that form within materials can be difficult to detect and almost impossible to repair. A successful method of autonomically repairing cracks that has the potential for significantly increasing the longevity of materials has been described, for example, in U.S. Pat. No. 6,518,330 to White et al. This self-healing system includes a material containing, for example, solid particles of Grubbs catalyst and capsules containing liquid dicyclopentadiene (DCPD) embedded in an epoxy matrix. When a crack propagates through the material, it ruptures the microcapsules and releases DCPD into the crack plane. The DCPD then contacts the Grubbs catalyst, undergoes Ring Opening Metathesis Polymerization (ROMP), and cures to provide structural continuity where the crack had been.

A wide variety of autonomous self-healing materials have been developed, and these materials can include a diverse array of healing agents beyond DCPD and Grubbs catalyst. Examples of self-healing material systems include chemistry based on polydimethylsiloxane (Cho et al., *Adv. Mater.* 2006, 18, 997-1000; Keller et al., *Adv. Funct. Mater.* 2007, 17, 2399-2404; Beiermann et al., *Smart Mater. Struct.* 2009, 18, 085001-7; Cho et al., *Adv. Mater.* 2009, 21, 645-649), a tungsten-catalyzed metathesis of bicyclic monomers (Kamphaus et al., *J. R. Soc. Interface* 2008, 5, 95-103), and activation of latent functional groups in the polymer matrix with common organic solvents (Caruso et al., *Macromolecules* 2007, 40, 8830-8832) and/or with epoxy-solvent mixtures (Caruso, *Adv. Funct. Mater.* 2008, 18, 1898-1904). These previous studies have used single-walled, liquid containing capsules prepared either by in situ emulsion polymerization or by interfacial polymerization techniques.

High temperatures and large shear stresses are common in processing polymeric materials and composites. Structural epoxy thermosets typically are cured at temperatures between 100-200° C. Typical thermoplastic materials are extruded under high shear stresses at temperatures greater than 150° C. Preparing self-healing versions of these materials has been difficult or impossible, as the conventional capsules used for the healing agents have been unable to survive the thermal and/or mechanical demands of the processing conditions. For example, the incorporation of liquid-filled capsules into polymers to impart self-healing functionality can be problematic if the processing temperature of the polymer is near the boiling point of the encapsulated liquid or near the degradation point of the capsule shell wall.

It is desirable to provide capsules that can encapsulate a healing agent, particularly a polymerizer, within a polymer matrix that is formed at high temperatures and/or shear stresses. It is also desirable to provide a method of making such capsules that is simple and scalable.

SUMMARY

In one aspect, the invention provides a method of making capsules that includes forming a mixture including a core liquid, a polyurethane precursor system, a first component of a two-component poly(urea-formaldehyde) precursor system, and a solvent. The method further includes emulsifying the mixture, adding a second component of the two-component poly(urea-formaldehyde) precursor system to the emulsified mixture, and maintaining the emulsified mixture at a temperature and for a time sufficient to form a plurality of capsules that encapsulate at least a portion of the core liquid.

In another aspect of the invention, there is a composition that includes a plurality of a capsules, and a polymerizer in the capsules, where the capsules include an inner capsule wall including a polyurethane, and an outer capsule wall including a poly(urea-formaldehyde).

In another aspect of the invention, there is a composite material that includes a solid polymer matrix, and a first plurality of capsules in the solid polymer matrix. The capsules include an inner capsule wall including a polyurethane, an outer capsule wall including a poly(urea-formaldehyde), and a healing agent encapsulated in the capsules.

To provide a clear and more consistent understanding of the specification and claims of this application, the following definitions are provided.

The term "polymer" means a substance containing more than 100 repeat units. The term "polymer" includes soluble and/or fusible molecules having long chains of repeat units, and also includes insoluble and infusible networks. The term "prepolymer" means a substance containing less than 100 repeat units and that can undergo further reaction to form a polymer.

The term "matrix" means a continuous phase in a material.

The term "capsule" means a closed object having a capsule wall enclosing an interior volume that may contain a solid, liquid, gas, or combinations thereof, and having an aspect ratio of 1:1 to 1:10. The aspect ratio of an object is the ratio of the shortest axis to the longest axis, where these axes need not be perpendicular. A capsule may have any shape that falls within this aspect ratio, such as a sphere, a toroid, or an irregular ameboid shape. The surface of a capsule may have any texture, for example rough or smooth.

The term "healing agent" means a substance that can contribute to the restoration of structural integrity to an area of a material that has been subjected to damage. Examples of healing agents include polymerizers, activators for polymerizers, solvents, and mixtures of these.

The term "polymerizer" means a composition that will form a polymer when it comes into contact with a corresponding activator for the polymerizer. Examples of polymerizers include monomers of polymers, such as styrene, ethylene, acrylates, methacrylates, and cyclic olefins such as dicyclopentadiene (DCPD) and cyclooctatetraene (COT); one or more monomers of a multi-monomer polymer system, such as diols, diamines and epoxides; prepolymers such as partially polymerized monomers still capable of further polymerization; and functionalized polymers capable of forming larger polymers or networks.

The term "activator" means anything that, when contacted or mixed with a polymerizer, will form a polymer. Examples of activators include catalysts and initiators. A corresponding activator for a polymerizer is an activator that, when contacted or mixed with that specific polymerizer, will form a polymer.

The term "catalyst" means a compound or moiety that will cause a polymerizable composition to polymerize, and that is not always consumed each time it causes polymerization. This is in contrast to initiators, which are always consumed at the time they cause polymerization. Examples of catalysts include ring opening metathesis polymerization (ROMP) catalysts such as Grubbs catalyst. Examples of catalysts also include silanol condensation catalysts such as titanates and dialkyltincarboxylates. A corresponding catalyst for a polymerizer is a catalyst that, when contacted or mixed with that specific polymerizer, will form a polymer.

The term "initiator" means a compound or moiety that will cause a polymerizable composition to polymerize and, in contrast to a catalyst, is always consumed at the time it causes polymerization. Examples of initiators include peroxides, which can form a radical to cause polymerization of an unsaturated monomer; a monomer of a multi-monomer polymer system, such as a diol, a diamine, and an epoxide; and amines, which can form a polymer with an epoxide. A corresponding initiator for a polymerizer is an initiator that, when contacted or mixed with that specific polymerizer, will form a polymer.

The term "solvent", in the context of a healing agent, means a liquid that can dissolve another substance, and that is not a polymerizer.

The term "encapsulant" means a material that will dissolve or swell in a polymerizer and, when combined with an activator, will protect the activator from reaction with materials used to form a solid polymer matrix. A corresponding encapsulant for a solid polymer matrix and for a polymerizer will protect an activator from reaction with materials used to form that specific solid polymer matrix and will dissolve or swell in that specific polymerizer.

The term "matrix precursor" means a composition that will form a polymer matrix when it is solidified. A matrix precursor may include a monomer and/or prepolymer that can polymerize to form a solid polymer matrix. A matrix precursor may include a polymer that is dissolved or dispersed in a solvent, and that can form a solid polymer matrix when the solvent is removed. A matrix precursor may include a polymer at a temperature above its melt temperature, and that can form a solid polymer matrix when cooled to a temperature below its melt temperature.

BRIEF DESCRIPTION OF THE DRAWINGS

The invention can be better understood with reference to the following drawings and description. The components in the figures are not necessarily to scale, emphasis instead being placed upon illustrating the principles of the invention.

DETAILED DESCRIPTION

It has been surprisingly discovered that double-walled capsules can be formed by a process that is simpler than conventional processes. Specifically, double-walled capsules can be formed in a single batch, eliminating the need to form and isolate single-walled capsules first, and then subsequently to form a second capsule wall around the single-walled capsules. In addition, the simplified process for forming double-walled capsules can successfully form capsules containing reactive core liquids, as the process does not require conventional reactants that would be expected to react with such core liquids.

Composite materials may be formed by including the double-walled capsules in a polymer matrix precursor, and then solidifying the precursor to form a solid polymer matrix. As the double-walled capsules can be more thermally stable than conventional single-walled capsules, the solidification process can be performed at elevated temperatures typically used for materials such as thermoplastics and structural thermosets. If the double-walled capsules contain a healing agent such as a solvent or a polymerizer, composite materials containing the capsules can be self-healing. Thus, double-walled capsules formed by the present methods can provide for self-healing materials that have been difficult or impossible to obtain previously.

Figure 1:
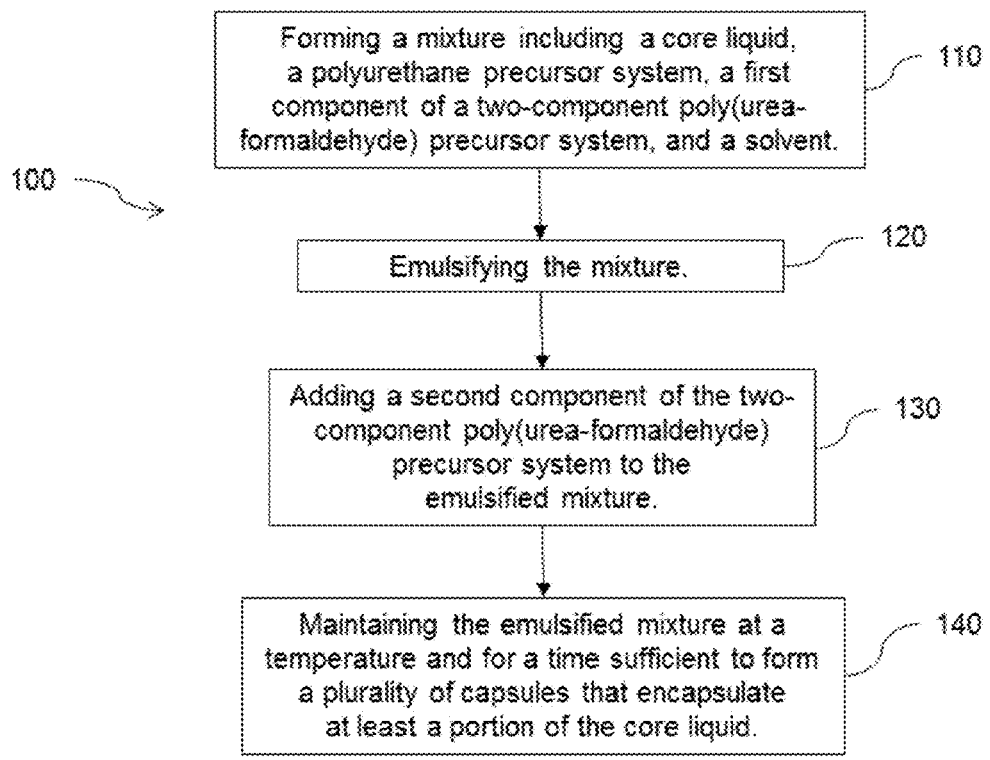
FIG. 1 depicts a method of making capsules.

FIG. 1 illustrates a schematic representation of an example of a method of making capsules. Method 100 includes forming 110 a mixture including a core liquid, a polyurethane precursor system, a first component of a two-component poly (urea-formaldehyde) precursor system, and a solvent; emulsifying 120 the mixture; adding 130 a second component of the two-component poly(urea-formaldehyde) precursor system to the emulsified mixture; and maintaining 140 the emulsified mixture at a temperature and for a time sufficient to form a plurality of capsules that encapsulate at least a portion of the core liquid.

The core liquid preferably includes a healing agent, which may be one or more of a polymerizer, an activator for a polymerizer and/or a solvent. A core liquid that includes a healing agent may include other ingredients, such as stabilizers, antioxidants, flame retardants, plasticizers, colorants and dyes, fragrances, adhesion promoters, charge-transfer donors, charge-transfer acceptors, or conductive microparticles.

Preferably the core liquid includes a polymerizer. For example the core liquid may include a polymerizer that is a monomer, a prepolymer, or a functionalized polymer having two or more reactive groups. For example, a polymerizer may include reactive groups such as alkene groups, epoxide groups, amine groups, phenol groups, aldehyde groups, hydroxyl groups, carboxylic acid groups, and/or isocyanate groups. Examples of polymerizers also include lactones (such as caprolactone) and lactams, which, when polymerized, will form polyesters and nylons, respectively.

In one example, the core liquid includes a polymerizer that is an alkene-functionalized monomer, prepolymer or polymer, which may form a polymer when contacted with other alkene groups. Examples of alkene-functionalized polymerizers include monomers such as acrylates; alkylacrylates including methacrylates and ethacrylates; olefins including styrenes, isoprene and butadiene; and cyclic olefins including dicyclopentadiene (DCPD), norbornene, cyclooctadiene and cyclooctatetraene (COT). Alkene-functionalized polymerizers such as COT and its derivatives, including alkyl-substituted derivatives such as n-butyl-cyclooctatetraene (n-butyl-COT), may form conjugated polymers. Examples of alkene-functionalized polymerizers also include diallyl phthalate (DAP), diallyl isophthalate (DAIP), triallyl isocyanurate, hexane dioldiacrylate (HDDA), trimethylol propanetriacrylate (TMPTA), and epoxy vinyl ester prepolymer and polymers. Examples of capsules that include alkene-functionalized polymerizers are disclosed, for example, in U.S. Pat. No. 6,518,330 to White et al., in U.S. Patent Application Publication No. 2010/0331445, with inventors Wilson et al., and in copending U.S. patent application Ser. No. 13/168,166, with inventors Odom et al.

In another example, the core liquid includes a polymerizer that is an epoxide-functionalized monomer, prepolymer or polymer, which may form an epoxy polymer when contacted with amine groups. Examples of epoxide-functionalized polymerizers include diglycidyl ethers of bisphenol A (DGEBA), such as EPON® 828; diglycidyl ethers of bisphenol F (DGEBF), such as EPON® 862; tetraglycidyl diaminodiphenylmethane (TGDDM); and multi-glycidyl ethers of phenol formaldehyde novolac polymers, such as SU-8. Examples of capsules that include epoxide-functionalized polymerizers are disclosed, for example, in U.S. Patent Application Publication No. 2011/0039980, with inventors Caruso et al.

In another example, the core liquid includes a polymerizer that is a functionalized siloxane, such as siloxane prepolymers and polysiloxanes having two or more reactive groups. Functionalized siloxanes include, for example, silanol-functional siloxanes, alkoxy-functional siloxanes, and allyl- or vinyl-functional siloxanes. Examples of capsules that include functionalized siloxanes as polymerizers are disclosed, for example, in U.S. Pat. No. 7,612,152 to Braun et al., and in U.S. Pat. No. 7,723,405 to Braun et al.

In another example, the core liquid includes a solvent as a healing agent. Examples of capsules that include a solvent are disclosed, for example, in U.S. Patent Application Publication No. 2011/0039980, with inventors Caruso et al. The capsules may include an aprotic solvent, a protic solvent, or a mixture of these. Examples of aprotic solvents include hydrocarbons, such as cyclohexane; aromatic hydrocarbons, such as toluene and xylenes; halogenated hydrocarbons, such as dichloromethane; halogenated aromatic hydrocarbons, such as chlorobenzene and dichlorobenzene; substituted aromatic solvents, such as nitrobenzene; ethers, such as tetrahydrofuran (THF) and dioxane; ketones, such as acetone and methyl ethyl ketone; esters, such as ethyl acetate, hexyl acetate, ethyl phenylacetate (EPA) and phenylacetate (PA); tertiary amides, such as dimethyl acetamide (DMA), dimethyl formamide (DMF) and N-methyl pyrrolidine (NMP); nitriles, such as acetonitrile; and sulfoxides, such as dimethyl sulfoxide (DMSO). Examples of protic solvents include water; alcohols, such as ethanol, isopropanol, butanol, cyclohexanol, and glycols; and primary and secondary amides, such as acetamide and formamide.

The polyurethane precursor system preferably includes a polyisocyanate and a first polyol. The polyisocyanate may include, for example, hexamethylene diisocyanate (HDI), toluene diisocyanate (TDI), methylene diphenyl diisocyanate (MDI), isophorone diisocyanate (IPDI), phenylene diisocyanate, or 1,4-diisocyanatobutane. The first polyol may include, for example, poly(ethylene glycol), poly(propylene glycol), glycerol, 1,4-butanediol, pentaerythritol, resorcinol, or a saccharide. In one example, the polyurethane precursor system includes DESMODUR L 75 (Bayer MaterialScience; Pittsburgh, Pa.) as the polyisocyanate, and includes resorcinol as the first polyol. DESMODUR L 75 is a prepolymer solution in ethyl acetate with a reported equivalent weight of 315 g and an isocyanate content of 13.3±0.4 percent by weight (wt %).

The first component of a two-component poly(urea-formaldehyde) precursor system preferably includes urea, a base, a second polyol and an anhydride. The base may include, for example, ammonium chloride. The second polyol may include, for example, phenol-functionalized monomers, prepolymers or polymers. Examples of phenol-functionalized monomers include resorcinol, and examples of phenol-functionalized polymers include novolac polymers and resole polymers. The anhydride may include, for example, oxalic anhydride, malonic anhydride, succinic anhydride, glutaric anhydride, adipic anhydride, maleic anhydride, and phthalic anhydride. The anhydride may include, for example, a maleic anhydride copolymer, such as poly(ethylene-co-maleic anhydride) (EMA). In one example, the poly(urea-formaldehyde) precursor system includes resorcinol as the second polyol, and includes EMA as the anhydride.

The solvent preferably includes water, and may further include an organic solvent. The organic solvent may be a water-miscible solvent, such as a solvent present in the polyurethane precursor system and/or in the poly(urea-formaldehyde) precursor system. The organic solvent may be a water-immiscible solvent, such as a solvent that preferentially partitions into an organic phase when the mixture is emulsified.

Emulsifying 120 the mixture includes stirring the mixture at a rate of from 300 to 1,000 revolutions per minute (rpm). The emulsifying may continue for some or all of the remainder of method 100, such as during some or all of the time required to add 130 the second component and/or some or all of the time required to maintain 140 the mixture at a temperature sufficient to form a plurality of capsules that encapsulate at least a portion of the core liquid.

The second component of the two-component poly(urea-formaldehyde) precursor system to the emulsified mixture preferably includes formaldehyde or a substance having two or more aldehyde functional groups. Examples of substances having two or more aldehyde functional groups include aldehyde-terminated dendrimers such as ald-PAMAM.

Maintaining 140 the emulsified mixture at a temperature and for a time sufficient to form a plurality of capsules that encapsulate at least a portion of the core liquid may include maintaining the emulsified mixture at a temperature above room temperature (25° C.). Preferably the temperature is maintained above room temperature, but below the boiling or decomposition temperature of any of the ingredients of the emulsified mixture. The temperature may be maintained from 30 to 100° C., from 40 to 75° C., from 50 to 70° C., or about 55° C.

Figure 2:
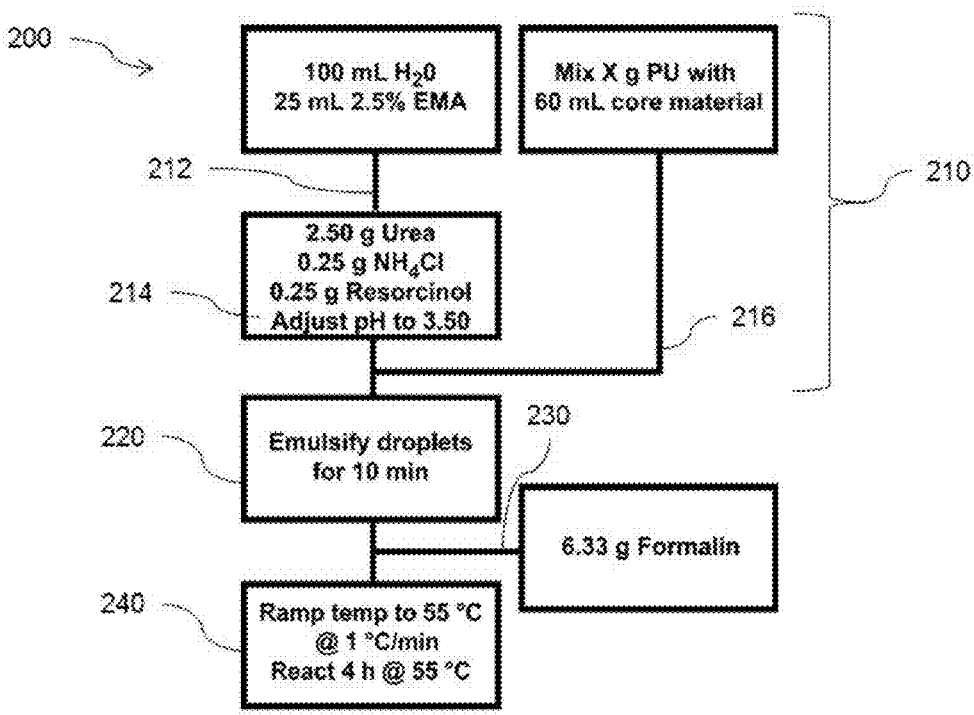
FIG. 2 depicts a method of making capsules.

FIG. 2 illustrates a schematic representation of an example of a method of making capsules. Method 200 includes forming 210 a mixture including a core liquid, a polyurethane precursor system, a first component of a two-component poly(urea-formaldehyde) precursor system, and a solvent; emulsifying 220 the mixture; adding 230 a second component of the two-component poly(urea-formaldehyde) precursor system to the emulsified mixture; and maintaining 240 the emulsified mixture at a temperature and for a time sufficient to form a plurality of capsules that encapsulate at least a portion of the core liquid. Forming 210 includes combining 212 a first mixture that includes water and poly(ethylene-co-maleic anhydride) with a second mixture that includes urea, ammonium chloride and resorcinol, adjusting 214 the pH of the second mixture to about 3.5, and adding 216 a third mixture that includes a polyurethane precursor and the core liquid. Adding 230 includes combining the emulsified mixture with formaldehyde (formalin) to provide a fourth mixture. Maintaining 240 includes raising the temperature of the fourth mixture to about 55° C. at a rate of 1° C. per minute (° C./min), and maintaining the temperature at about 55° C. for about 4 hours.

Methods 100 or 200 can be used to produce polyurethane/poly(urea-formaldehyde) (PU/UF) microcapsules in a single batch process. This is an unexpected result in view of previous methods of preparing double-walled capsules, which involved multiple, discrete steps of (1) an interfacial reaction between isocyanates and polyols to build a polyurethane (PU) shell wall, (2) rinsing and filtration of the resulting PU capsules, and (3) redispersion of the PU capsules in an aqueous medium and deposition of a urea-formaldehyde (UF) shell wall to form capsules having an inner PU shell wall and an outer UF shell wall. (Li et al., *Polym. Bull.* 2008, 60, 725-731).

In contrast to these conventional methods of making capsules, methods 100 and 200 combine in situ poly(urea-formaldehyde) microencapsulation with an interfacial microencapsulation. In method 200, the interfacial encapsulation uses a commercially available PU prepolymer (DESMODUR L 75). Methods 100 and 200 can offer an additional simplification in that the polyol used to form the internal polyurethane capsule wall can be the same as the polyol used to form the external poly(urea-formaldehyde) capsule wall. In method 200, resorcinol was the polyol used for the polymerizations of both the polyurethane and the poly(urea-formaldehyde).

Capsules formed by the method of FIG. 1 or FIG. 2 preferably include a core liquid in the capsules, and include an inner capsule wall and an outer capsule wall. Preferably the core liquid includes a healing agent, the inner capsule wall includes a polyurethane, and the outer capsule wall includes a poly(urea-formaldehyde). Preferably the healing agent includes a polymerizer.

The ability to encapsulate a wide variety of polymerizers is a further improvement over previous methods of preparing double-walled capsules. The 3-step process of Li et al. (*Polym. Bull.* 2008, 60, 725-731) used a polyamine as a conventional polyurethane crosslinking agent in forming its inner PU shell wall. This conventional reactant would be expected to react with polymerizers such as epoxide-functionalized polymerizers, phenol-functionalized polymerizers, aldehyde-functionalized polymerizers, or carboxylic acid-functionalized polymerizers. Accordingly, the methods of FIGS. 1 and 2 are believed to be useful in preparing double-walled capsules containing a variety of healing agents, including polymerizers. Such capsules may be used to impart self-healing properties to a wider variety of materials than those that were previously accessible.

Double-walled capsules that include a core liquid in the capsules, an inner capsule wall including a polyurethane, and an outer capsule wall including a poly(urea-formaldehyde) can be more thermally stable than conventional single-walled capsules. Preferably at least 50 percent by weight (wt %) of the core liquid remains in the capsules when the capsules are maintained at a temperature of 180° C. for 2 hours. Preferably at least 60 wt %, at least 70 wt %, at least 80 wt %, or at least 90 wt % of the core liquid remains in the capsules when the capsules are maintained at a temperature of 180° C. for 2 hours.

The double-walled capsules may have an aspect ratio of from 1:1 to 1:10, preferably from 1:1 to 1:5, more preferably from 1:1 to 1:3, more preferably from 1:1 to 1:2, and more preferably from 1:1 to 1:1.5. In one example, the capsules may have an average diameter of from 10 nanometers (nm) to 1 millimeter (mm), more preferably from 30 to 500 micrometers, and more preferably from 50 to 300 micrometers. The average diameter of the double-walled capsules can be varied by changing the rate of stirring during the emulsification.

The double-walled capsules enclose an interior volume containing the core liquid. The thickness of the inner shell wall may be, for example, from 10 to 1,000 nanometers, from 50 to 700 nanometers, or from 100 to 500 nanometers. The thickness of the outer shell wall may be, for example, from 10 to 1,000 nanometers, from 50 to 700 nanometers, or from 100 to 500 nanometers. The total thickness of the double-wall (inner and outer walls together) may be from 20 to 2,000 nanometers, from 100 to 1,000 nanometers, from 150 to 800 nanometers, or from 200 to 700 nanometers.

The selection of capsule wall thickness may depend on a variety of parameters, such as the nature of the solid polymer matrix, and the conditions for making and using the composite. For example, a capsule wall that is too thin may break during processing. If the capsule is intended to release its contents in response to a stimulus, however, the capsule wall should not be so thick that it will not rupture when the stimulus is applied. In one example, the thicknesses of the inner and outer capsule walls can be varied by changing the amounts of polyurethane precursor and/or poly(urea-formaldehyde) precursor, and/or by changing the rate of stirring during the emulsification.

Composite materials may be formed by including the double-walled capsules in a polymer matrix precursor, and then solidifying the precursor to form a solid polymer matrix. As the double-walled capsules can be more thermally stable than conventional single-walled capsules, the solidification process can be performed at elevated temperatures typically used for materials such as thermoplastics and structural thermosets.

Figure 3:
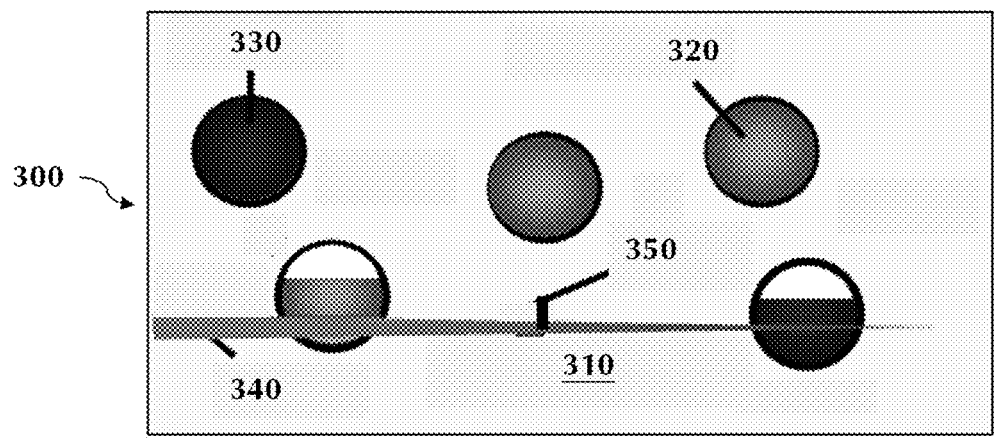
FIG. 3 depicts a schematic representation of a composite material containing capsules.

FIG. 3 is a schematic representation of a composite material 300 that includes a solid polymer matrix 310, and a first plurality of capsules 320 in the solid polymer matrix. The capsules 320 include an inner capsule wall including a polyurethane, an outer capsule wall including a poly(urea-formaldehyde), and a core liquid encapsulated in the capsules 320. The core liquid may include a healing agent, such as a polymerizer. The composite material 300 optionally may include a plurality of particles 330, which may include an activator for a polymerizer, in the solid polymer matrix 310.

The solid polymer matrix 310 may include a polyamide such as nylon; a polyester such as poly(ethylene terephthalate) and polycaprolactone; a polycarbonate; a polyether; an epoxy polymer; an epoxy vinyl ester polymer; a polyimide such as polypyromellitimide (for example KAPTAN); a phenol-formaldehyde polymer such as BAKELITE; an amine-formaldehyde polymer such as a melamine polymer; a polysulfone; a polyacrylonitrile-butadiene-styrene) (ABS); a polyurethane; a polyolefin such as polyethylene, polystyrene, polyacrylonitrile, a polyvinyl, polyvinyl chloride and poly (DCPD); a polyacrylate such as poly(ethyl acrylate); a poly(alkylacrylate) such as poly(methyl methacrylate); a polysilane such as poly(carborane-silane); and a polyphosphazene. The solid polymer matrix 310 may include an elastomer, such as an elastomeric polymer, an elastomeric copolymer, an elastomeric block copolymer, and an elastomeric polymer blend. Self-healing materials that include an elastomer as the solid polymer matrix are disclosed, for example, in U.S. Pat. No. 7,569,625 to Keller et al. The solid polymer matrix 310 may include a mixture of these polymers, including copolymers that include repeating units of two or more of these polymers, and/or including blends of two or more of these polymers.

The solid polymer matrix 310 may include other ingredients in addition to the polymeric material. For example, the matrix may contain one or more stabilizers, antioxidants, flame retardants, plasticizers, colorants and dyes, fragrances, or adhesion promoters. An adhesion promoter is a substance that increases the adhesion between two substances, such as the adhesion between two polymers. One type of adhesion promoter that may be present includes substances that promote adhesion between the solid polymer matrix 310 and the capsules 320, and/or between the solid polymer matrix 310 and the optional particles 330.

The capsules 320 include an inner capsule wall including a polyurethane, an outer capsule wall including a poly(urea-formaldehyde), and a core liquid encapsulated in the capsules 320. Preferably the core liquid includes a healing agent, such as a polymerizer, in which case the capsules 320 isolate the polymerizer in the capsules until the composite 300 is subjected to damage that forms a crack in the composite. Once the damage occurs, the capsules in contact with the damaged area can rupture, releasing the liquid polymerizer into the crack plane.

It is expected that microcapsules having a poly(urea-formaldehyde) (UF) exterior will perform effectively as delivery vehicles for healing agents in a self-healing material. Secondary nucleation onto a UF surface can allow the microcapsules to bond to the matrix for efficient rupture in a self-healing composite. See, for example, Yang et al., *Macromolecules* 2008, 41, 9650-9655.

In the example of a self-healing material, the adhesion between the matrix and the capsules may influence whether the capsules will rupture or debond when a crack is formed in the composite. To promote one or both of these forms of adhesion, various silane coupling agents may be used. Another type of adhesion promoter that may be present includes substances that promote adhesion between the solid polymer matrix 310 and the polymer formed from the polymerizer. The adhesion between the matrix and this polymer may influence whether the composite can be healed once damage has occurred. To promote the adhesion between the solid polymer matrix 310 and the polymer formed from the healing agent, various unsaturated silane coupling agents may be used.

The composite material 300 optionally may include particles 330 in the solid polymer matrix 310. Particles 330 may include an activator for a polymerizer. The optional activator may be a general activator for polymerization, or a corresponding activator for a specific polymerizer present in the composite material. Preferably the activator is a corresponding activator for a liquid polymerizer present in the first plurality of capsules 320. The activator may be a catalyst or an initiator.

The activator may be a two-part activator, in which two distinct substances must be present in combination for the activator to function. In one example of a two-part activator system, a corresponding polymerizer may contain alkene-functional polymerizers. In this example, atom transfer radical polymerization (ATRP) may be used, with one of the activator components being present with the liquid healing agent, and the other activator component acting as the initiator. One component can be an organohalide such as 1-chloro-1-phenylethane, and the other component can be a copper(I) source such as copper(I) bipyridyl complex. In another exemplary system, one activator component could be a peroxide such as benzoyl peroxide, and the other activator component could be a nitroxo precursor such as 2,2,6,6-tetramethylpiperidinyl-1-oxy. These systems are described in Stevens et al., *Polymer Chemistry: An Introduction,* 3rd Edition; Oxford University Press, New York, (1999), pp. 184-186.

The activator may be present in optional activator particles 330. The activator may be present in a mixture with other ingredients, such as one or more stabilizers, antioxidants, flame retardants, plasticizers, colorants and dyes, fragrances, or adhesion promoters. The optional particles may be present in the form of solid particles, or as a second plurality of capsules. Optional activator particles 330 may be helpful in protecting the activator from the conditions required to form the composite 300 and/or from the conditions in which the composite will be used. For a two-part activator, one part of the activator may be in the optional activator particles 330, and the other part of the activator may be in the solid polymer matrix or in the first plurality of capsules 320.

The optional activator particles 330 may include a mixture of an activator and an encapsulant. These activator particles may be made by a variety of techniques, and from a variety of materials. For example, small particles or a powder of the activator may be dispersed into a liquid containing the encapsulant, followed by solidification of the mixture of encapsulant and activator. These activator particles preferably are microparticles having an average diameter of at most 500 micrometers. The encapsulant preferably is soluble in, or swells in, the liquid healing agent, and is a solid at room temperature. The liquid healing agent may dissolve the encapsulant, releasing the activator and forming a polymer. The liquid healing agent may swell the encapsulant so that the particle can be penetrated by the liquid healing agent sufficiently to allow polymerization of a polymerizer of the liquid healing agent upon contact with the activator. Examples of particles that include an activator and an encapsulant are disclosed, for example, in U.S. Pat. No. 7,566,747 to Moore et al.

The optional activator particles 330 may include capsules, and a liquid that includes the activator in the capsules. Such a second plurality of capsules may include double-walled capsules as described above for the first plurality of capsules, or may include single-walled capsules. The second plurality of capsules may include other ingredients in addition to the activator. For example, the second plurality of capsules may contain one or more solvents, stabilizers, antioxidants, flame retardants, plasticizers, colorants and dyes, fragrances, or adhesion promoters.

The composite material such as 300 may be self-healing. When the composite 300 is subjected to a crack 340, the core liquid including a healing agent from the capsules 320 can flow into the crack, forming a polymer 350. The crack faces in the solid polymer matrix 310 are thus bonded to each other or to the polymer 350 formed in the crack. It is desirable for the first plurality of capsules 320, and any optional particles 330 to be dispersed throughout the composite, so that a crack 340 will intersect and break one or more capsules 320, releasing the core liquid containing the healing agent. If the healing agent is a polymerizer that requires an activator, the released liquid polymerizer preferably contacts the activator of optional particles 330 to form the polymer 350.

A method of making a composite material, such as composite material 300, includes combining ingredients including a matrix precursor, a first plurality of capsules, and optionally a plurality of particles. The method further includes solidifying the matrix precursor to form a solid polymer matrix. The first plurality of capsules includes a core liquid. The matrix precursor may be any substance that can form a solid polymer matrix when solidified. The combining and/or solidification may include heating at a temperature above 150° C. for at least 30 minutes, at least 1 hour, or at least 2 hours. The combining and/or solidification may include heating at a temperature above 180° C. for at least 30 minutes, at least 1 hour, or at least 2 hours. The combining and/or solidification may include heating at a temperature of from 100 to 200° C. for a time of from 30 minutes to 10 hours, from 1 to 5 hours, or from 2 to 4 hours.

In one example, the matrix precursor includes a monomer and/or prepolymer that can polymerize to form a polymer. The capsules and optional particles may be mixed with the monomer or prepolymer. The matrix precursor may then be solidified by polymerizing the monomer and/or prepolymer of the matrix precursor to form the solid polymer matrix.

In another example, the matrix precursor includes a polymer in a matrix solvent. The polymer may be dissolved or dispersed in the matrix solvent to form the matrix precursor, and the capsules and optional particles then mixed into the matrix precursor. The matrix precursor may be solidified by removing at least a portion of the matrix solvent from the composition to form the solid polymer matrix.

In another example, the matrix precursor includes a polymer that is at a temperature above its melting temperature. The polymer may be melted to form the matrix precursor and then mixed with the capsules and optional particles. The matrix precursor may be solidified by cooling the composition to a temperature below the melt temperature of the polymer to form the solid polymer matrix.

The following examples are provided to illustrate one or more preferred embodiments of the invention. Numerous variations can be made to the following examples that lie within the scope of the invention.

EXAMPLES

Materials

Ethyl phenylacetate (EPA), urea, ammonium chloride ($NH_4Cl$), resorcinol, and formaldehyde solution (formalin, 37 w/v %) were purchased from Sigma-Aldrich and used as received. The commercial polyurethane (PU) prepolymer, DESMODUR L 75, was purchased from Bayer MaterialScience and used as received. DESMODUR L 75 is a prepolymer solution in ethyl acetate with a reported equivalent weight of 315 g and an isocyanate content of 13.3±0.4 wt %. Ethylene-maleic anhydride (EMA) copolymer (ZEMAC-400) powder with an average molecular weight of 400 kDa was graciously donated by Vertellus Specialties Inc. (Indianapolis, Ind.) and used as a 2.5 wt % aqueous solution. Diglycidyl ether of bisphenol A resin (DGEBA or EPON 828) was used as received from Miller-Stephenson with the curing agent Ancamine DETA received from Air Products in a ratio of 12 parts per Kindred (pph) curing agent to EPON 828 to form epoxy samples (EPON 828:DETA).

Example 1

Formation of Microcapsules

Double-walled capsules were formed according to the procedure outlined in FIG. 2. The amount of Desmodur® L 75, denoted as "X" g in FIG. 1, was varied from 0 to 8 g. The prepolymer was dissolved into the core liquid of 60 mL EPA before being added to the stirred emulsion. Capsules were imaged using a Leica DMR Optical Microscope at various magnifications, and Image) software was used to measure capsule diameters from acquired images for each batch of capsules produced.

Figure 4:
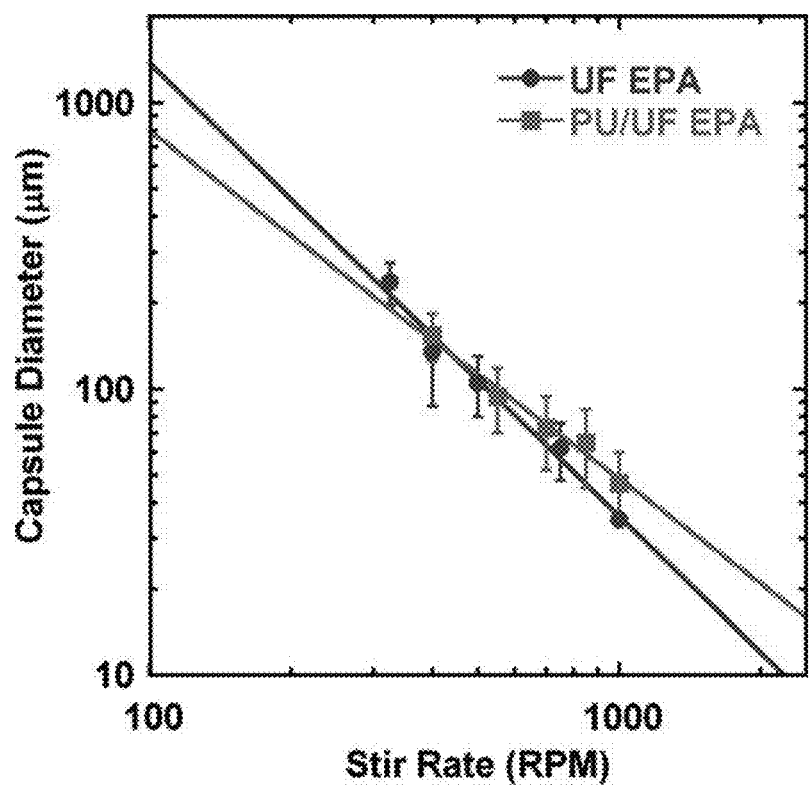
FIG. 4 is a log-log plot of capsule diameter as a function of stir rate for single-walled capsules (UF EPA) and double-walled capsules (PU/UF EPA).

PU/UF capsules of various sizes were produced by changing the stirring speed. FIG. 4 is a log-log plot of capsule diameter as a function of stir rate for capsules where the core material is EPA alone or EPA mixed with 1.5 g PU (Desmodur L 75 prepolymer). The average diameter and one standard deviation (error bars) are plotted on the basis of measurements of at least 100 capsules for each batch. The graph of FIG. 4 shows the change in average diameter of PU/UF EPA capsules as a function of stir rate, for capsules produced with a constant amount of PU prepolymer. The capsule diameter is compared to UF EPA capsules for a range of stir rates (Brown et al., *J. Microencapsulation* 2003, 20, 719-730). The addition of PU prepolymer did not significantly change the mean size of the resultant PU/UF EPA microcapsules from the sizes of the reported UF EPA capsules.

Example 2

Thermal Analysis of Capsules

Thermogravimetric analysis (TGA) was performed on a Mettler-Toledo TGA851e, calibrated with indium, aluminum, and zinc standards. Unless otherwise indicated, a heating rate of 10° C./min was used in an atmosphere of nitrogen. For each experiment, the sample of approximately 5 mg was accurately weighed to +0.02 mg into an alumina crucible. The mass loss was recorded during a heating cycle over the temperature range of 25 to 650° C. for a dynamic experiment. For isothermal experiments, the temperature was ramped from 25 to 180° C. (10° C./min) and subsequently held at 180° C. for 2 h. Afterward, samples were heated from 180-600° C. (10° C./min).

Figure 5:
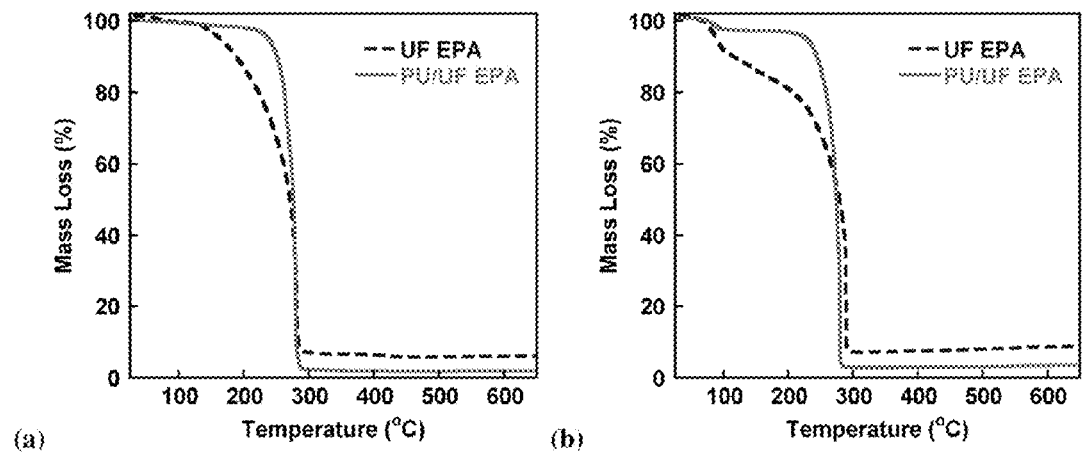
FIGS. 5A and 5B are dynamic thermogravimetric analysis (TGA) curves for single-walled capsules (UF EPA) and double-walled capsules (PU/UF EPA).

FIGS. 5A and 5B are dynamic TGA curves for UF EPA capsules (dashed line) and the PU/UF EPA capsules of Example 1 (solid line). The data of FIG. 5A was obtained the day after the capsules were formed, and the data of FIG. 5B was obtained one year later. Onset temperatures of mass loss for the capsules of Example 1 were higher than UF EPA capsules. Assuming the mass of the shell wall was negligible, the mass loss for these capsules was >90%. This behavior was consistent from batch to batch of UF EPA microcapsules and PU/UF EPA microcapsules. With regard to the long-term stability of the capsules at room temperature, both the UF capsules and the PU/UF EPA capsules of Example 1 were tested again after 1 year (FIG. 5B). Both types of capsules absorbed water, as evidenced from the initial mass loss around 100° C. The PU/UF EPA capsules were still more stable over time, since the sharp drop in mass loss occurred at a temperature close to the boiling point of EPA, whereas the UF EPA capsules showed a gradual mass loss at elevated temperatures.

Figure 6:
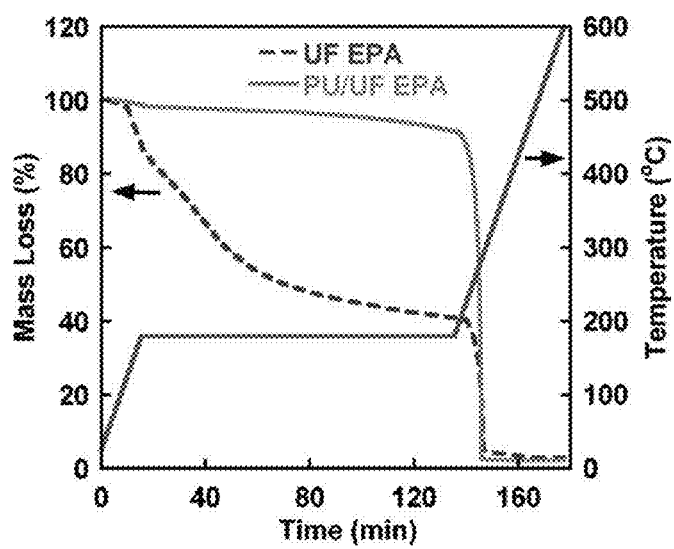
FIG. 6 is a plot of representative isothermal TGA curves for single-walled capsules (UF EPA) and double-walled capsules (PU/UF EPA).

To better simulate capsule stability during a commercial polymer processing, the capsules were tested in an isothermal protocol, in which the temperature was ramped from room temperature to 180° C. and then held constant at 180° C. for 2 h. FIG. 6 is a plot of representative isothermal TGA curves for UF EPA capsules (dashed line) and PU/UF EPA capsules (solid line), plotted versus the temperature profile (25 to 180° C. at 10° C./min), held at 180° C. for 2 h, and then heated from 180-600° C. at 10° C./min). The average diameter of the capsules tested was 150 micrometers, and 1.5 g of PU was added to the PU/UF capsules. Single-walled UF capsules (made without the addition of PU) lost a significant amount of mass (~60%) during the 2 h isotherm, while the PU/UF capsules lost only about 10%.

Figure 7:
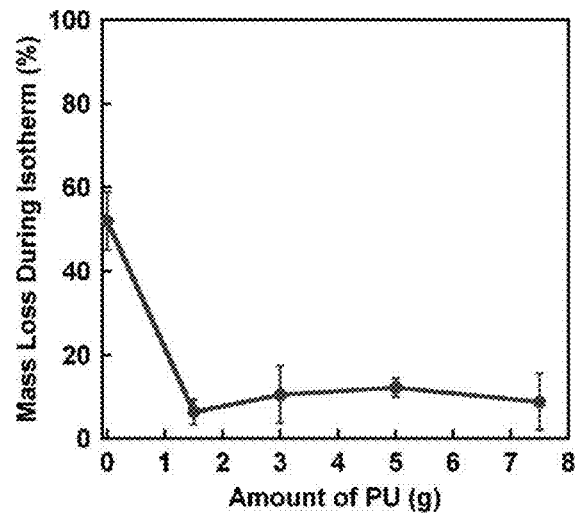
FIG. 7 is a plot of average mass loss during a 2 hour isothermal TGA at 180° C. for capsules containing ethyl phenyl acetate (EPA) and having an average capsule diameter of 50 micrometers, where the capsule shell wall included poly(urea-formaldehyde) (UF) and varying amounts of polyurethane (PU).

This dramatic improvement in thermal stability was also analyzed as a function of PU added to the core liquid. FIG. 7 is a plot of average mass loss during a 2 h isothermal TGA at 180° C. for EPA microcapsules having an average capsule diameter of 50 micrometers, with varying amounts of PU. The average value is plotted from 2-3 independent runs, and error bars indicate one standard deviation. The data point for 0 g PU added to the core is shown as a control. Capsule size was not observed to affect the mass percent lost during these isothermal experiments.

Example 3

Mechanical Testing of Capsules

Single-capsule compression testing was performed on a series of microcapsule batches with ≥8 capsules from each batch tested at a displacement rate of 5 micrometers per second using a previously described setup and procedure (Keller, M. W., et al. *Exp. Mech.* 2006, 46, 725-733). For each experiment, a dry microcapsule was compressed between flat parallel plates and imaged through a stereo microscope (Nikon SMZ-2T) during testing while the load versus displacement behavior was recorded.

Figure 8:
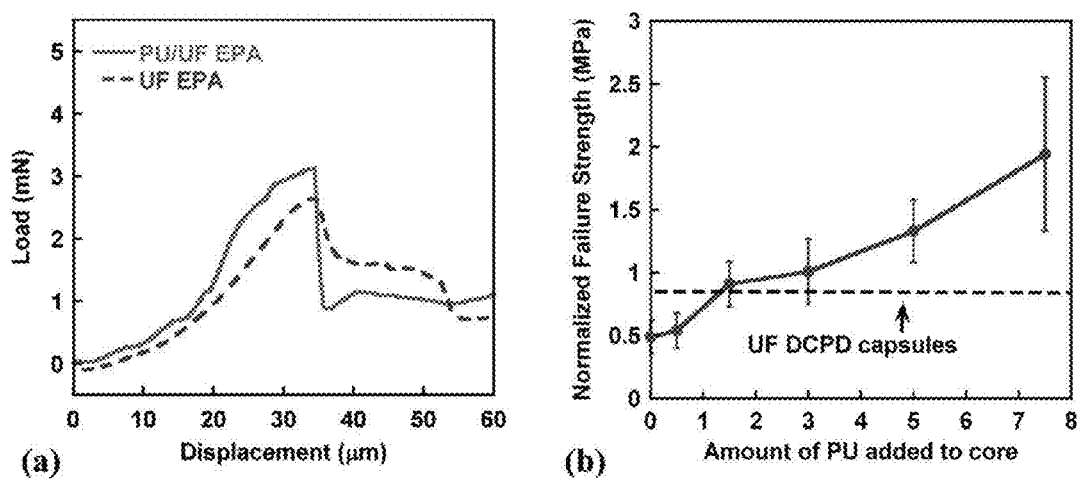
FIG. 8A is a plot of load to failure as a function of displacement for single-walled capsules (UF EPA) and double-walled capsules (PU/UF EPA)
FIG. 8B is a plot of normalized failure strength as a function of amount of added polyurethane (PU) for double-walled capsules.

A representative plot for a UF EPA capsule (dashed line) and a PU/UF EPA capsule of Example 1 (solid line) is shown in FIG. 8A. In comparing capsules of similar diameter, the PU/UF EPA capsules had higher loads to failure than the UF capsules. Furthermore, as the amount of PU added to the EPA core increased and average capsule diameter was held constant, the failure strength also increased (FIG. 8B). The dashed line on the plot indicates the failure strength of UF DCPD capsules tested by Keller et al. at a similar capsule diameter (Keller, M. W., et al. *Exp. Mech.* 2006, 46, 725-733). The normalized failure strength decreased as capsule diameter increased, which corresponded to the trend observed in other capsule compression studies (Sun, G., et al. *Int. J. Pharm.* 2002, 242, 307-311).

A summary of all results for EPA capsules tested at different diameters with a constant amount of PU added to the core (1.5 g for EPA) is listed in Table 1, below. The average and one standard deviation are reported for 8-10 capsules for each entry. As a comparison, the data for UF DCPD capsules is shown from Keller et al.

TABLE 1

Mechanical properties of capsules

| Capsule Type | Capsule Average Diameter (μm) | Average Failure Force (mN) | Total Shell Thickness (nm) | Normalized Failure Strength (MPa) |
| --- | --- | --- | --- | --- |
| UF EPA | 59 ± 14 | 1.4 ± 0.6 | 213 ± 14 | 0.5 ± 0.1 |
| UF EPA | 73 ± 13 | 2.4 ± 0.6 | 213 ± 14 | 0.6 + 0.1 |
| UF EPA | 128 ± 20 | 2.6 ± 0.9 | 213 ± 14 | 0.2 ± 0.06 |
| UF EPA | 146 ± 29 | 2.3 ± 1.0 | 213 ± 14 | 0.1 ± 0.04 |
| PU/UF EPA | 63 ± 7 | 2.8 ± 0.4 | 350 ± 31 | 0.9 ± 0.2 |
| PU/UF EPA | 70 ± 18 | 2.8 ± 1.2 | 350 ± 31 | 0.8 ± 0.3 |
| PU/UF EPA | 123 ± 12 | 4.2 ± 0.5 | 350 ± 31 | 0.35 ± 0.04 |
| PU/UF EPA | 178 ± 26 | 6.7 ± 1.2 | 350 ± 31 | 0.3 ± 0.04 |
| UF DCPD [Keller][1] | 65 ± 7 | 2.7 ± 0.7 | 175 ± 33 | 0.8 ± 0.3 |
| UF DCPD [Keller][1] | 187 ± 15 | 6.5 ± 1.6 | 175 ± 33 | 0.24 ± 0.04 |

Example 4

Microscopy of Composites

Scanning electron microscopy (SEM, Philips XL30 ESEM-FEG) was used to image fracture surfaces of 5 wt % capsules in an EPON 828: DETA matrix cured at 35° C. for 24 h. SEM images were acquired after sputter-coating the sample with gold-palladium. The procedure to image capsule shell walls by AFM was based on examination of microtomed surfaces as follows: thin films of epoxy samples (EPON 828: DETA) containing 5 wt % capsules were ultramicrotomed into 300 nm thick slices and mounted onto glass slides for imaging. Atomic force microscopy (AFM) images were acquired on an Asylum Research MFP-3D AFM in tapping mode with Budget Sensors Tap300AL tips.

The addition of the PU prepolymer resulted in PU/UF microcapsules with thicker shell walls than UF capsules. Moreover, two distinct shell morphologies were observed when the PU prepolymer was added to the core liquid.

Figure 9A:
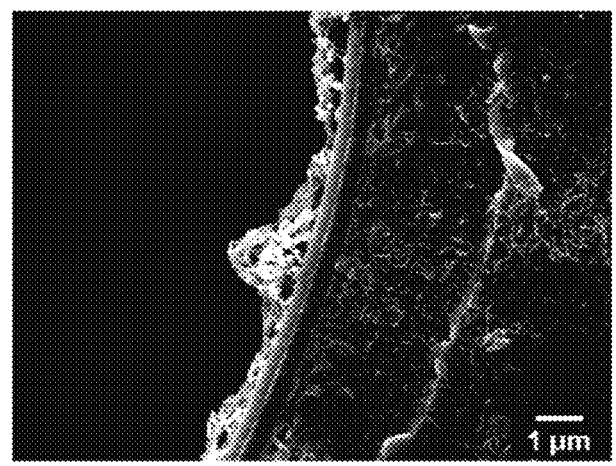
FIG. 9A is a scanning electron microscopy (SEM) image of an epoxy sample containing a double-walled capsule.
Figure 9B:
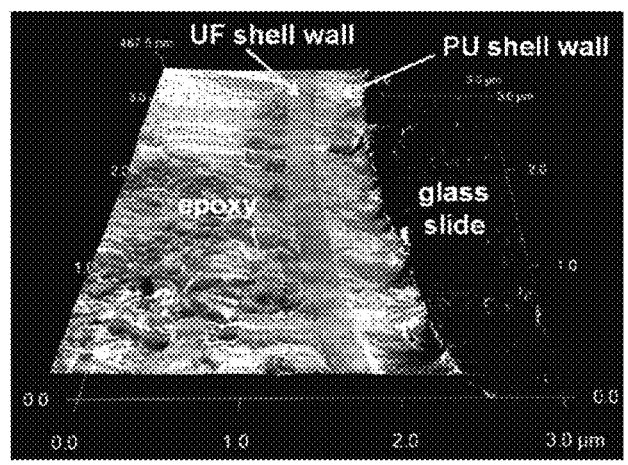
FIG. 9B is an AFM image of an epoxy sample containing a double-walled capsule.
Figure 9C:
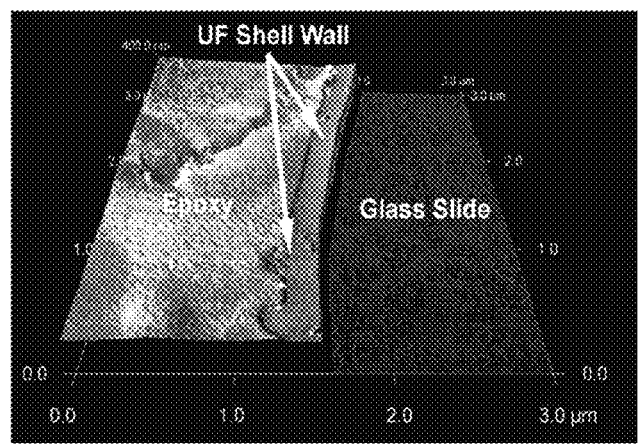
FIG. 9C is an AFM image of an epoxy sample containing a single-walled capsule.

FIG. 9A is an SEM image of an epoxy sample showing the double wall morphology for a PU/UF EPA capsule with core material containing 7.5 g PU. FIGS. 9B and C are AFM phase images with a 3D representation of a microtomed epoxy sample showing the capsule shell wall morphology of a PU/UF EPA capsule with 7.5 g PU (FIG. 9B) and UF EPA capsule (FIG. 9C). SEM imaging of the epoxy surfaces (FIG. 9A) revealed an abrupt change in texture that suggests a distinct double-wall morphology. FIG. 9B is an AFM image of a PU/UF EPA capsule prepared with the highest amount of PU used in Example 1 (7.5 g). A color map was created from raw AFM phase images, which displayed a difference in phase for the two regions. These regions were designated as different shell walls based on a series of images taken as the amount of PU was systematically increased. Based entirely on their location, the inner texture was assigned as the PU shell wall, and the outer texture was assigned as the UF shell wall. The precise chemical composition of these textures could not be confirmed. As a control, FIG. 9C is an AFM image of a UF EPA capsule, which showed only one phase with a uniform texture, consistent with a single wall, and a color map was also added to this image in order to make this concept more evident.

Figure 10:
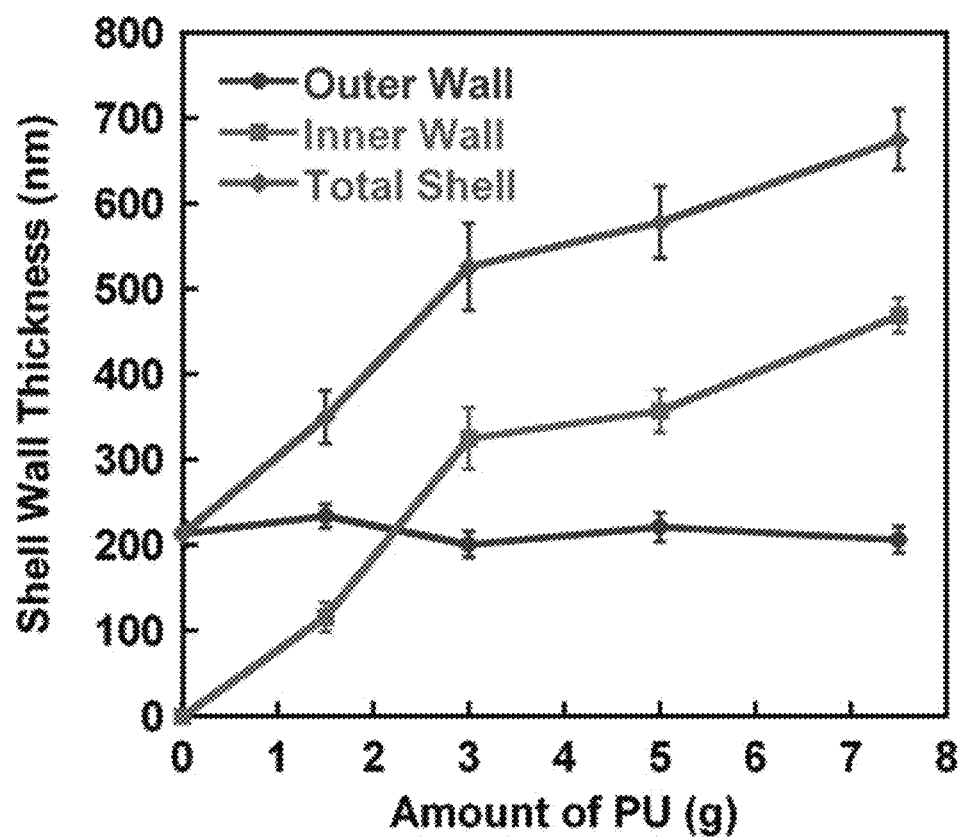
FIG. 10 is a graph of average thicknesses of PU/UF EPA capsule shell wall components and total shell thickness, as a function of the amount of PU added with the EPA core liquid.

Capsule shell wall thicknesses were measured from a series of AFM phase images using Image) analysis software. FIG. 10 is a graph of average thicknesses of PU/UF EPA capsule shell wall components and total shell thickness, as a function of the amount of PU added to the EPA core liquid. At least 30 measurements using ImageJ were taken, using one AFM phase image per data set, for the average thickness. Error bars show one standard deviation of the measurements for one image. As the amount of PU prepolymer added to the core increased, the size of the inner wall, which is presumably a PU layer formed by interfacial polymerization, also increased. The outer wall is most likely a UF layer formed by the in situ polymerization reaction. The thickness of this outer wall did not change within observational scatter. In contrast, the UF EPA capsules showed only one capsule wall.

While various embodiments of the invention have been described, it will be apparent to those of ordinary skill in the art that other embodiments and implementations are possible within the scope of the invention. Accordingly, the invention is not to be restricted except in light of the attached claims and their equivalents.

What is claimed is:

1. A composition, comprising:
   a plurality of a capsules, and
   a polymerizer in the capsules;
   where the capsules comprise an inner capsule wall comprising a polyurethane, and an outer capsule wall comprising a poly(urea-formaldehyde), wherein at least 50 wt % of the polymerizer remains in the capsules when maintained at a temperature of 180° C. for 2 hours,
   wherein the inner capsule wall has an average thickness of from 50 to 700 nanometers,
   and wherein the outer capsule wall has an average thickness of from 100 to 500 nanometers.

2. The composition of claim 1, further comprising a solvent in the capsules.

3. The composition of claim 1, where the capsules have an average diameter of from 30 to 500 micrometers.

4. The composition of claim 1, where the polymerizer includes a reactive group selected from the group consisting of alkene, epoxide, amine, phenol, aldehyde, hydroxyl, carboxylic acid, and isocyanate.

5. The composition of claim 1, where the polymerizer is an alkene-functionalized monomer, pre-polymer, or polymer.

6. The composition of claim 5, where the polymerizer is selected from the group consisting of acrylates, alkylacrylates, olefins, cyclic olefins, and combinations thereof.

7. The composition of claim 1, where the polymerizer is an epoxide-functionalized monomer, prepolymer, or polymer.

8. The composition of claim 7, where the polymerizer is selected from the group consisting of diglycidyl ethers of bisphenol A, diglycidyl ethers of bisphenol F, tetraglycidyl diaminodiphenylmethane, multi-glycidyl ethers of phenol formaldehyde novolac polymers, and combinations thereof.

9. The composition of claim 1, where the polymerizer is a siloxane.

10. The composition of claim 9, where the polymerizer is selected from the group consisting of silanol-functional siloxanes, alkoxy-functional siloxanes, allyl-functional siloxanes, vinyl-functional siloxanes, and combinations thereof.

* * * * *